United States Patent
Shenoy et al.

(10) Patent No.: US 9,384,473 B2
(45) Date of Patent: Jul. 5, 2016

(54) METHODS AND SYSTEMS FOR CREATING ONLINE UNIFIED CONTACT AND COMMUNICATION MANAGEMENT (CM) PLATFORM

(76) Inventors: Subrao Venugopal Shenoy, San Jose, CA (US); Seema Subrao Shenoy, San Jose, CA (US)

(*) Notice: Subject to any disclaimer, the term of this patent is extended or adjusted under 35 U.S.C. 154(b) by 201 days.

(21) Appl. No.: 13/200,773

(22) Filed: Sep. 30, 2011

(65) Prior Publication Data

US 2012/0143969 A1  Jun. 7, 2012

Related U.S. Application Data

(60) Provisional application No. 61/455,538, filed on Oct. 21, 2010.

(51) Int. Cl.

| G06F 15/16 | (2006.01) |
|---|---|
| G06Q 10/10 | (2012.01) |
| G06F 17/30 | (2006.01) |
| G06Q 50/00 | (2012.01) |

(52) U.S. Cl.
CPC ...... *G06Q 10/1093* (2013.01); *G06F 17/30575* (2013.01); *G06Q 10/10* (2013.01); *G06Q 50/01* (2013.01)

(58) Field of Classification Search
CPC . G06Q 10/109; G06Q 10/1093; G06Q 10/10; G06Q 50/01; G06F 17/30575
USPC ................ 709/201, 207, 212, 219; 379/93.01
See application file for complete search history.

(56) References Cited

U.S. PATENT DOCUMENTS

| 2004/0225525 | A1* | 11/2004 | Weitzman .......................... 705/1 |
|---|---|---|---|
| 2008/0009277 | A1* | 1/2008 | Bidwell .......................... 455/418 |
| 2008/0168348 | A1* | 7/2008 | Bergstrom et al. ........... 715/700 |
| 2008/0177745 | A1* | 7/2008 | Eldering et al. ............... 707/10 |
| 2010/0020949 | A1* | 1/2010 | Robbins et al. ............ 379/93.01 |
| 2010/0077027 | A1* | 3/2010 | Chitturi et al. ................ 709/203 |
| 2010/0161369 | A1* | 6/2010 | Farrell et al. ..................... 705/8 |
| 2010/0162105 | A1* | 6/2010 | Beebe et al. .................. 715/273 |
| 2010/0180001 | A1* | 7/2010 | Hardt ........................... 709/207 |
| 2010/0217809 | A1* | 8/2010 | Vymenets et al. ............ 709/206 |

(Continued)

OTHER PUBLICATIONS

Silverman (Silverman, Matt, The Small Business Guide to Google Apps, Mar. 19, 2010, Mashable.com, p. 3-9).*

(Continued)

*Primary Examiner* — Tauqir Hussain
*Assistant Examiner* — Michael A Keller
(74) *Attorney, Agent, or Firm* — ONE LLP

(57) ABSTRACT

Sales people (agents) get engaged with a lot of contacts from past, present and future prospects that manifests on multiple contact platforms. They end up having their contacts and calendars split in multiple places including communication and messages leading to inefficiencies, loss of business and delayed response time to the end customer. Customer Relationship Management today is still a one dimensional tool, one that featured Email as the core for direct agent-client relationship. CRM should be redefined and relabeled as Communication Management to open up the idea that relationships with clients are developed across multiple platforms though multiple channels. As will be understood by reading below, the invention accomplishes this in an elegant manner. The phrases Communication Management in the main patent title and Customer Relationship Management (CRM) have the same semantics in this document.

5 Claims, 12 Drawing Sheets

(56) References Cited

U.S. PATENT DOCUMENTS

| | | | | |
|---|---|---|---|---|
| 2010/0325222 | A1* | 12/2010 | Taylor et al. | 709/206 |
| 2011/0029608 | A1* | 2/2011 | Harple et al. | 709/204 |
| 2011/0035464 | A1* | 2/2011 | Dolin et al. | 709/217 |
| 2011/0078190 | A1* | 3/2011 | Samuel et al. | 707/780 |
| 2011/0113084 | A1* | 5/2011 | Ramnani | 709/201 |
| 2011/0179161 | A1* | 7/2011 | Guy et al. | 709/224 |
| 2011/0289053 | A1* | 11/2011 | Smarr et al. | 707/625 |
| 2012/0060096 | A1* | 3/2012 | Makam et al. | 715/736 |
| 2013/0091204 | A1* | 4/2013 | Loh et al. | 709/204 |
| 2013/0117679 | A1* | 5/2013 | Polis et al. | 715/738 |

OTHER PUBLICATIONS

Rosenblatt (Rosenblatt, Seth, Digsby CNET Editors' Review, Sep. 17, 2009, CBS Interactive Inc., p. 1).*

Mayhew (Mayhew, Bruce, Drip Marketing: Love Your Customers, 2008, Bruce Mayhew Consulting Communication Training, pp. 1-2).*

Chandler (Chandler, Ashley, Ahold goes Google: International food retailer moves 55,000 employees to Google Apps, Sep. 16, 2010, Google Official Enterprise Blog, p. 1).*

Ho (Ho, Erica, The Complete Guide to Creating a Consolidated, Master Contact List, Jun. 7, 2010, Lifehacker.com, pp. 1-4).*

McCorvey (McCorvey, J.J., How to Use Google Apps to Improve Your Business, Jun. 10, 2010, Inc.com, pp. 1-3).*

Orth (Orth, Eric, Use Microsoft Outlook with Google Apps for email, contacts, and calendar, Jun. 9, 2009, Google Official Enterprise Blog, pp. 1-2).*

Parry (Parry, Chad, Import your mail and contacts from other accounts, May 13, 2009, Official Gmail Blog, p. 1).*

Pash (Pash, Adam, Five Best Instant Messengers, Apr. 3, 2008, LifeHacker.com, p. 5).*

Trapani (Trapani, Gina, How to Make Your Small Business Look Big, Mar. 13, 2009, Harvard Business Review, pp. 1-2).*

Uberti (Uberti, Justin, Say hello to Gmail voice and video chat, Nov. 11, 2008, Official Gmail Blog, pp. 1-2).*

Sahana Mysore (How to Sync Facebook Events with Google Calendar, Feb. 15, 2009, MediaBistro Inc. A division of Prometheus Global Media, retrieved from http://www.insidefacebook.com/2009/02/15/how-to-sync-facebook-events-with-google-calendar/, on Aug. 28, 2014).*

* cited by examiner

Fig 1: Illustrative diagram of an industry grade cloud system
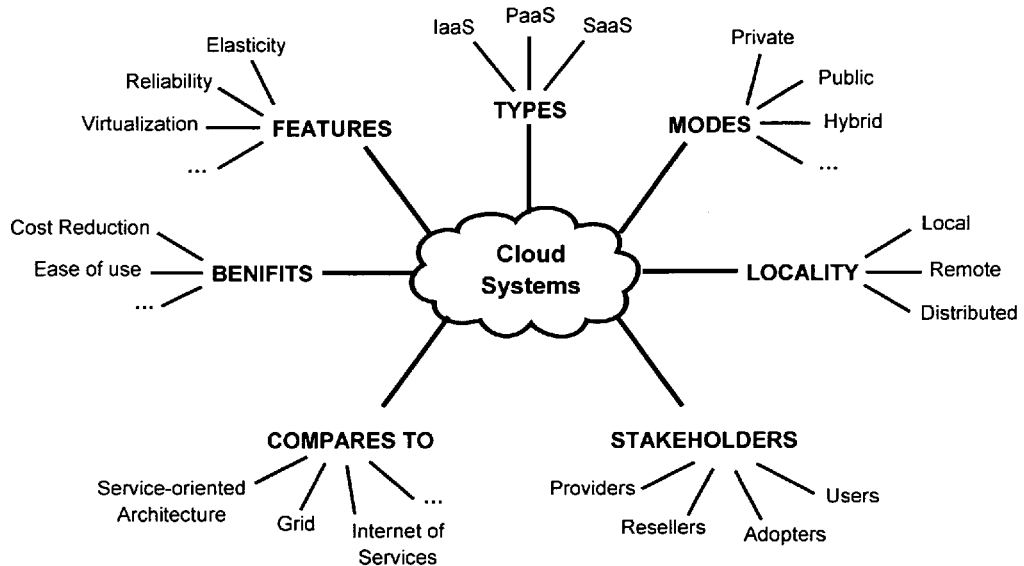
NON-EXHAUSTIVE VIEW ON THE MAIN ASPECTS FORMING A CLOUD SYSTEM

Fig 2: Multi Channel Contact / Calendar / Communications
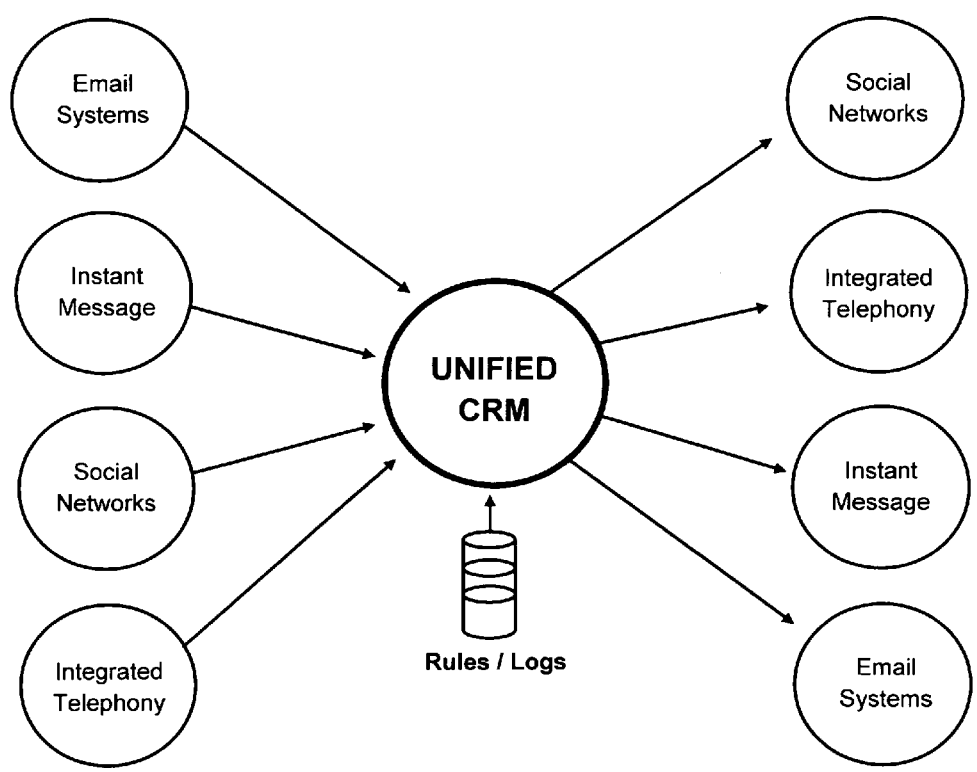

Fig 3: Architecture Diagram
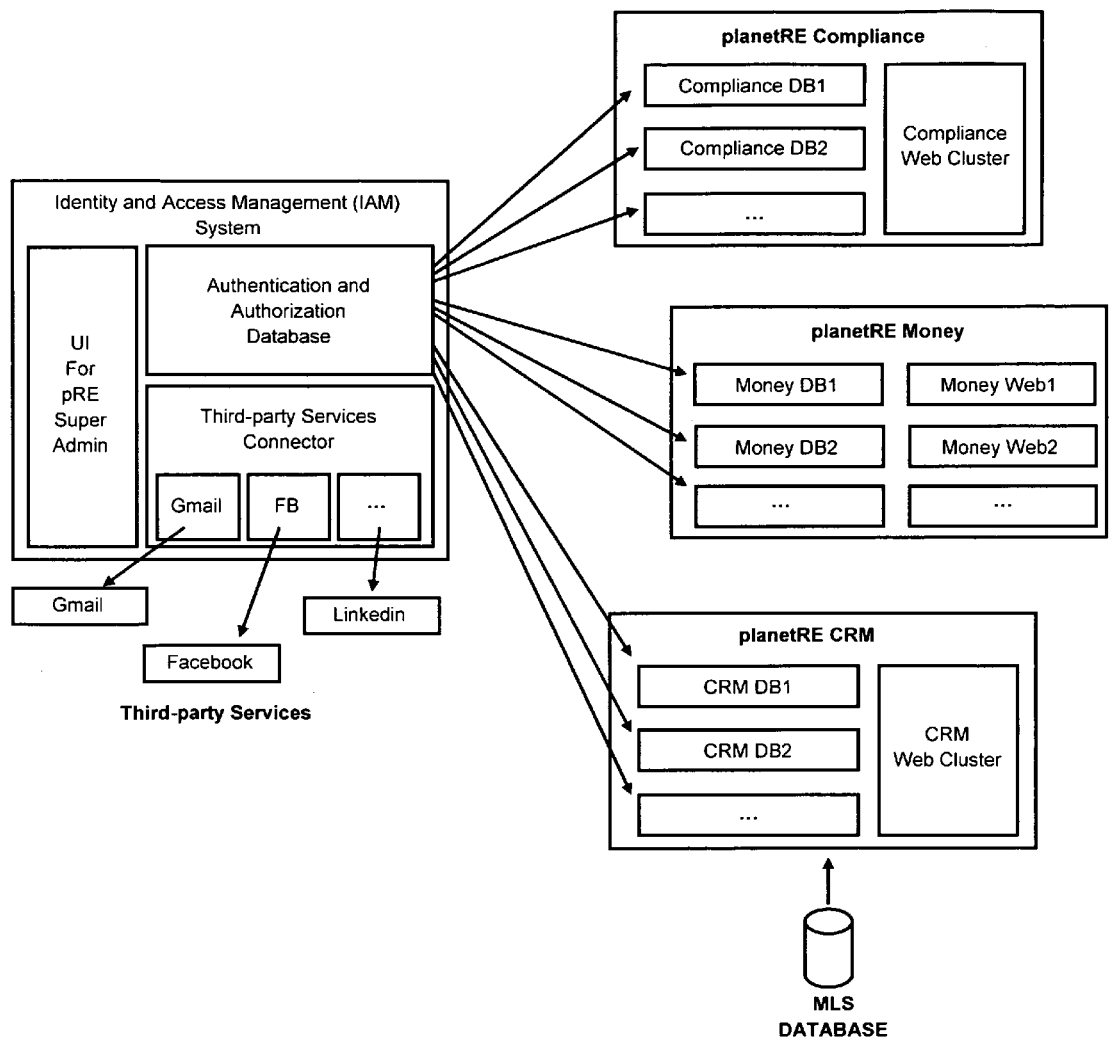

Fig 4: Panel Allowing multiple social contact / calendar synchs

| Home | Connections | Groups | Communications | Campaigns | Reports | Admin | Social Media | Calendar / Connections |

| Google Calendar | Gmail Contacts | Plaxo Contacts | FB Calendar | FB Contacts | Outlook Contacts |

[ Import Facebook Contacts ]

[ Read Contacts from Facebook ]

Note: Only those facebook users who shared contact information will be fetched

[ Save Selected Contacts ]

| Select | Picture | Name | Linked |
|---|---|---|---|
| ☐ | 👤 | Jennifer Davis | ✓ |
| ☐ | 👤 | George Auatin | ✓ |
| ☐ | 👤 | Bobmanuel Tonye | ✓ |
| ☐ | 👤 | Kate John | ✓ |
| ☐ | 👤 | John James | ✓ |
| ☐ | 👤 | Jacob Slive | ✓ |

Fig 5: Panel Showing Centralized Social Media Contacts & Calendar

Home  Connections  Groups  Communications  Campaigns  Reports  Admin  Social Media  Calendar / Connections

[My Top Agents]  [My New Connections]  [My Alerts]  [My Appointments / Events]

[My Bizz]  [My Transaction]  [My Financials]

| Contacts | Expand |
|---|---|
| John Jones | Pending |
| Jenifer Davis | Listed |
| Jim James | Referral |
| Smith Wills | Contact |
| | More.. |

| Calendars | | Expand |
|---|---|---|
| John Jones | 8.00AM | Outlook |
| Meet Donna Smith | 9.00AM | Company |
| Go to bank | 10.00AM | Google |
| Training | 11.00AM | Outlook |
| | | More.. |

| Communications | | Expand |
|---|---|---|
| John Jones | "Need to talk" | Facebook |
| Hugh Perry | Request to connect | Linkedin |
| Sly Dunbar | New Listing | Outlook |
| Pete Tosh | Attend Seminar | Gmail |
| | | More.. |

| Campaigns | Expand |
|---|---|
| John Jones | Pending |
| Jenifer Davis | Listed |
| Jim James | Referral |
| Smith Wills | Contact |
| | More.. |

Fig 6: Data Structure for Lead Type

| CommunicationThreads | Lead | |
|---|---|---|
| CommunicationThreadId<br>CommunicationId<br>CommunicationType<br>CommunicationDate<br>CommunicationDirection<br>CommunicationSubject<br>Communicationbody<br>CommunicationFileLocation | LeadId<br>FirstName<br>MiddleName<br>LastName<br>StreetNumber<br>StreetName<br>City<br>State<br>Zip<br>MobilePhone<br>HomePhone<br>WorkPhone<br>ExtentionPhone<br>AdditionalPhone<br>HomeFax<br>WorkFax<br>Email<br>CompanyId<br>IsActive<br>CreatedBy<br>CreatedDate<br>LModBy<br>LModDate<br>Unsubscribe<br>PropertyTypeBuyer<br>BedRoom<br>BathRoom<br>Stories<br>Garage<br>Age<br>SqFt<br>LotSize<br>PriceMin<br>PriceMax<br>TimeFrameFrom<br>TimeFrameTo<br>OtherInfo<br>City_s<br>PropertyTypeSeller<br>Bedroom_s<br>Bathroom_s<br>Stories_s<br>Garage_s<br>Age_s<br>SqFt_s<br>LotSize_s<br>PriceMin_s<br>PriceMaz_s<br>TimeFrameFrom_s<br>TimeFrameTo_s<br>OtherInfo_s<br>Gender<br>Employer<br>SpouseFirstName<br>SpouseMiddleName<br>SpouseLastName<br>SpouseGender<br>Children<br>IsPlaxo | IsGoogle<br>LeadType<br>LeadSource<br>LeadStatus<br>LeadAcquireDate<br>ExpectedLeadConversionDate<br>ActualLeadConversionDate<br>NextContactDate<br>OptInStatus<br>ListingNotify<br>OkayToIM<br>IsTopClient<br>AveragePrice<br>DOB<br>WeddingAnniversary<br>SaleAnniversary<br>SaleAnniversary<br>PurchaseAnniversary<br>PushedToPlaxoOn<br>PushedToGoogleOn |

Fig 7: Display of Multiple Social Channels Authorized Lead Sources

| Home Connections Groups Communications Campaigns Reports Admin Social Media Calendar / Connections |
|---|

| Connection Home | New Connection | Search | Import Connections |

⦿ Assign to Single Agent  ⦿ Send to Multiple Agents
Office: [Select ▼]  Agent: [Select ▼]  Rating: [Select ▼] ★★★★★
27 connections found
Select All / Clear All

| Select | Name | Source | FB Search | LI Search | Delete |
|---|---|---|---|---|---|
| ☐ | Jennifer Davis | Linkedin | f🔍 | in🔍 | 🗑 |
| ☐ | George Austin | Facebook | f🔍 | in🔍 | 🗑 |
| ☐ | Bobmanuel Tonye | Facebook | f🔍 | in🔍 | 🗑 |
| ☐ | Kate John | Linkedin | f🔍 | in🔍 | 🗑 |
| ☐ | John James | Facebook | f🔍 | in🔍 | 🗑 |
| ☐ | Kelly G | Web Lead | f🔍 | in🔍 | 🗑 |
| ☐ | Mary Evans | Gmail | f🔍 | in🔍 | 🗑 |
| ☐ | Jacob Slive | Outlook | f🔍 | in🔍 | 🗑 |

Fig 8: Integrated Linked IN Search in CRM
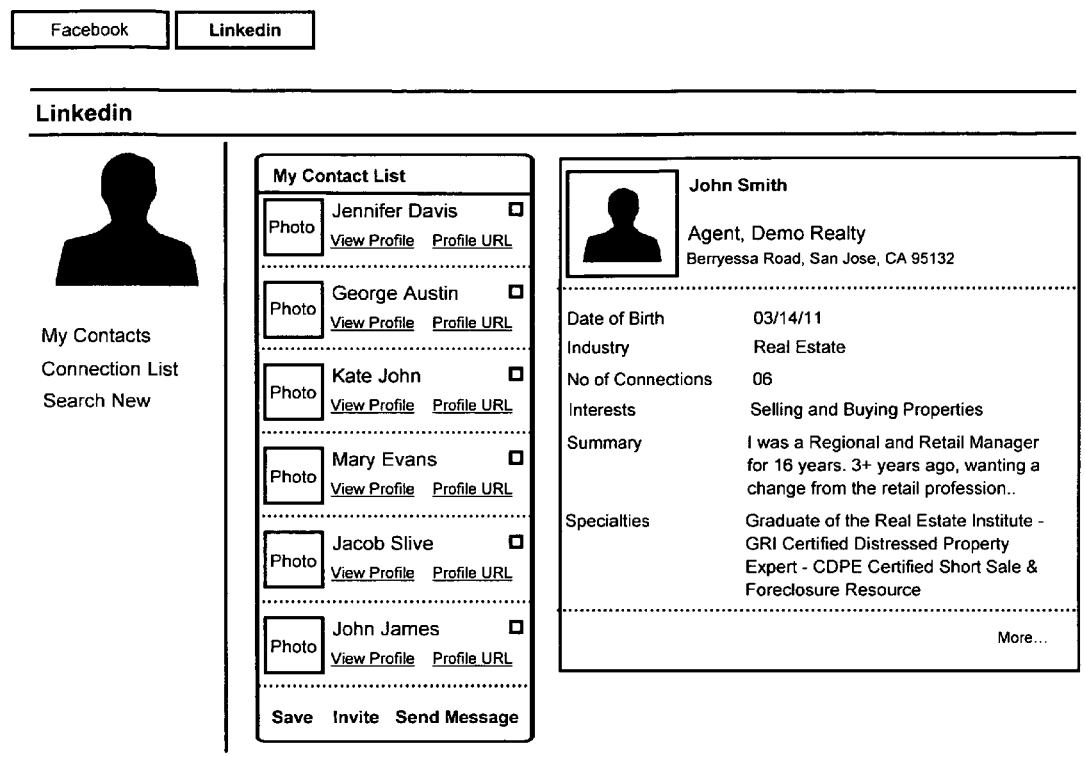

Fig 9a: Integrated Linked IN Search in CRM (part 1)

| Summary | Action Entry | Assign History | Send Email | Send Email | Communication Summary |

General Info

First Name
Middle Name
Last Name
Gender
Employer
Email
Mobile Phone
Work Phone
Home Phone
Extension Phone
Additional Phone
Fax Work
Fax Home

Spouse Info

First Name
Middle Name
Last Name
Spouse Gender
Children

Other Info

Facebook
Twitter
LinkedIn
Push to plaxo ☐
Push to Google ☐

Quick Stats

Account Created: 7/25/2011  4.00.36 AM
Last Contacted   9/21/2011  5.00.18 PM
Avg Price ($)
Okay to IM
Category
Source
Status
Is Top Client?
Group           No Group Assigned
Created-By      Company-Generated

Property Purchase Preferences

City/Area
Type of Property
Bedrooms
Bathrooms
Stories
Garage
Age
SqFt
Lot Size
Price Range
From [ ] To [ ]
Time Frame to buy:

Comments

Mailing Details

Street Address
City
State
Zip

Campaign

Unsubscribe ☐

Important Dates

Acquisition
Next Contact
Expected Conversation
Conversation
Date of Birth
Wedding Anniversary
Sale Anniversary
Purchase Anniversary Fig 9b: Integrated Linked IN Search in CRM (part 2)

| | Personal Information | | Shared Networks |
|---|---|---|---|
| Photo | Name | Jennifer Davis | 👤 👤 👤 👤 |
| | Gender | Female | |
| | Hometown | San Diego, California | 👤 👤 👤 👤 |
| Send Gifts | About Me | I am a native of San Diego and a Graduate of the Oxford University. | |
| Write on wall | Birthday | 04/27/1985 | 👤 👤 👤 👤 |
| View full profile | Education | West High, Oxford University. | |
| | Work History | Real Estate | |
| Authentication Network | Books | you can win | |
| | Music | Eminem, Batboys, Shakira | |
| | Movies | Notebook. A walk to remember. | |
| | Activities | Swimming, Polo, Skating | |
| | Likes | Real Estate, California Agents, RealFace | |

Fig 10: Diagram Cross Referencing Leads with own network
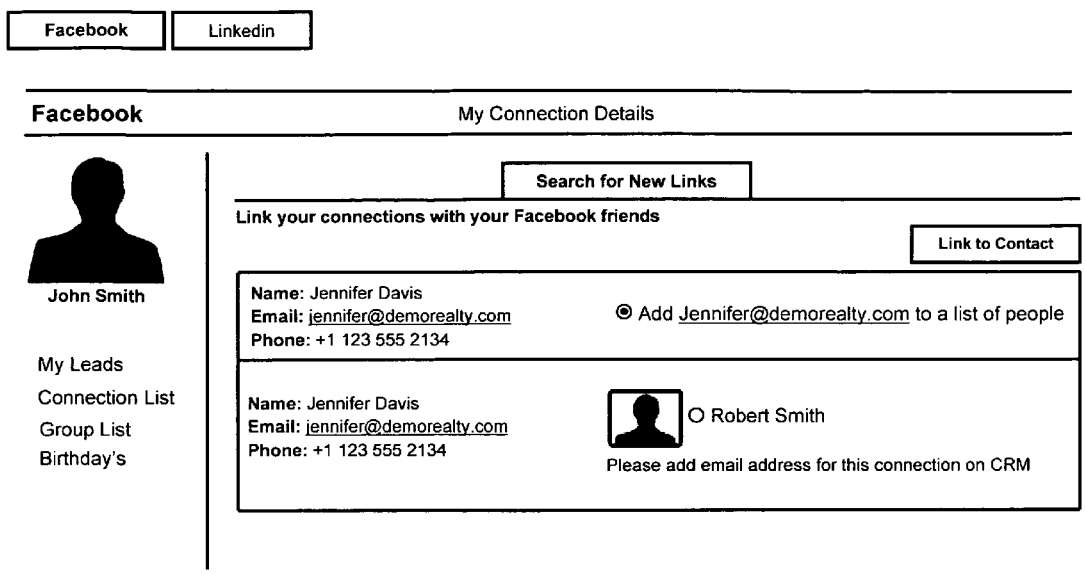

Fig 11: Diagram Showing Central Communication Panel (In/Out)

| Communication Log | Social Communication |

Search Communications

First Name: [ ]   Last Name: [ ]
Comm. Type: [All ▼]   Durations: [All ▼]
From Date: [ ▼]   To Date: [ ▼]
Subject: [ ]   Description: [ ]

[SEARCH]

| Type | Connection Name | Subject | Message / Post | Communication Type | Direction | Date /Time (PST) |
|---|---|---|---|---|---|---|
| f | Kate John | Wall Post | Search for your Dream Property | Facebook | OutBound | 9/27/2011 |
| t | Jennifer Davis | Tweet | Yes, our dashboard makes it very simple to upgrade | Twitter | InBound | 9/25/2011 |
| t | George Austin | Tweet | We do not include signs | Twitter | OutBound | 9/11/2011 |
| f | Mary Evans | Wall Post | Provide buyers with instant property information | Facebook | InBound | 9/082011 |
| f | Jacob Slive | Tweet | Fixed Monthly Price! No per message or lead charges! | Twitter | InBound | 8/25/2011 |
| t | Donna Smith | Wall Post | Access to online reports of properties and leads. | Facebook | InBound | 7/05/2011 |
| t | John James | Wall Post | Yes I do... | Facebook | InBound | 7/04/2011 |

US 9,384,473 B2

METHODS AND SYSTEMS FOR CREATING ONLINE UNIFIED CONTACT AND COMMUNICATION MANAGEMENT (CM) PLATFORM

CROSS REFERENCE TO RELATED APPLICATIONS

This patent application claims the benefits of the filing dates of U.S. Provisional Application No. 61/455,538 filed Oct. 21, 2010 entitled METHODS AND SYSTEMS FOR CREATING ONLINE UNIFIED CONTACT AND COMMUNICATION MANAGEMENT (CM) PLATFORM, the entire contents of which provisional agreement is hereby incorporated herein by reference. The applicants and original inventors are Subrao Venugopal Shenoy and Seema Subrao Shenoy, both residents of San Jose, Calif. and US Citizens. This document has substitute specifications and formatting as required by USPTO letter dated Oct. 17, 2011. No new information has been added to the application besides reformatting.

COPYRIGHT NOTICE

A portion of the disclosure of this patent documentation contains material that is subject to copyright protection. The copyright owner has no objection to the facsimile reproduction by anyone of the patent document or the patent disclosure, as it appears in the Patent and Trademark Office Patent file or records, but otherwise reserves all copyright rights whatsoever.

SUMMARY OF INVENTION

The invention includes a method of centralizing and synchronizing contacts coming from all contact sources like emails, social media the salesperson subscribes to. Simple import of contacts can also be done using CSV imports from other legacy sources the user has. Rules may be established in all imports and synching to restrict to certain type of leads or be able to bulk them up in predefined social groups or annotated to an existing social campaign in progress.

In one embodiment, the invention may be configured to synchronize all contacts at once from one or more social channels OR driven by rules of synching based on user's preferences. The synched contact can be further authorized by acceptance as a friend or a contact by the lead from their own social media accounts which will proceed to show that a specific user is authorized and ready to communicate on one or more social channels. This authorization may be a prerequisite for user to communicate with leads and prospects on social media.

In a subsequent embodiment, new leads and prospects entered in the CRM manually or entered automatically through APIs from other sources or just coming from social media synchs described earlier may be cross referenced to multiple social media sources to get a better cross section of the user's profile on different social media channels. New contents could be created manually in the central database and same cross sections from different social media may be done to show the cross section to the user.

The features and functions of the invention may be implemented by encoding computer readable software in the form of Microsoft NET, AJAX, C++ and SQL language or other computer readable formats that can configure a computer or server to perform the features and functions.

The invention may be designed and implemented on a computer and may be connected to a network for communication with many other computers to practice the invention. A system configured to operate according to the invention may include a plurality of PCs, Tablets or mobile PDAs connected to the internet via individual modems or other communication means such as Wi-Fi and Wireless 3G/4G communications. The invention may involve a number of functions to be performed by a computer processor, such as a microprocessor. The microprocessor may be specialized or dedicated microprocessor that is configured to perform certain tasks by executing machine readable software code for a particular task. The microprocessor may be configured to operate and communicate with other devices such as direct memory access modules, memory storage devices, internet related hardware and other devices that relate to the transmission of data in accordance with this invention. The software code may be configured using software formats like C++, C#, SQL, AJAX, SQL and XML language that may be used to define and present information that relate to operations of devices required to carry out the functional operations related to the invention. The code may be written in many forms and styles in the art of computer programming. Different code formats, code configurations, styles and forms of software programs and other means to configure and release the operation of the microprocessor in accordance with the invention will not depart from the spirit and scope of the inventions, which is defined by the detail description as well as subparts included therein.

In another aspect of the invention, allow synchronizing of multiple user calendars across multiple channels including email, local calendars, third party program that generate work flow calendars and one or more social media calendars. The system allows single calendar for the user from all sources. Subsequently, user can create new calendar events in the CRM and broadcast them back to one more calendar outlets they have including local calendar and social media calendars.

In another aspect of the invention, communication is done bi-directional between the user and all their leads hosted on multiple email system, instant messaging or social media or integrated telephony platforms. Mass micro blogs may be broadcasted from the CRM manually or done automatically using complex time and recipient criteria. One example of implementation is sending a pre created micro blog campaign and broadcasted xx days after the first contact date and sends to all contact that come from a specific Social Channel; contact type is HOT and contact category is investor and/or landlord. The system would store and retrieve all these logs on demand based on different search filters.

The core invention enables bi-directional contact, calendar synchs and communication to happen between the CRM user and their potential leads over the lead incubation period and also logging all events for any search required.

BRIEF DESCRIPTION OF THE DRAWINGS

FIG. 1 shows one sample illustrative diagram of a general cloud system with which the invention can be deployed. It could be deployed using on premise computing also.

FIG. 2 is a block diagram of the basic invention showing how various elements of contact, calendar and communications connect to the CRM, connect in the invention FIG. 3 is a diagram of the invention embedded in an overall enterprise architecture connecting to other transaction management and financial management (ERP) pieces.

FIG. 4. is a diagram showing of synching multiple social media contacts and calendars in one place FIG. 5 shows the display of such a central calendar and contact on main home page FIG. 6 is an exemplary data structure showing organization of lead data in the database.

FIG. 7. is an exemplary diagram showing how leads are displayed from multiple sources including authorization as shown with green check boxes.

FIG. 8. is an exemplary diagram showing how lead search happens on LinkedIn

FIG. 9a and FIG. 9b. are exemplary diagrams showing how detailed lead information stored on multiple social media in the central lead record.

FIG. 10. is an exemplary diagram showing how leads coming from one social channel can be cross referenced with the users' own social network.

FIG. 11. is an exemplary diagram showing Central Communication Panel for all Social Media for inbound/outbound social media messages

DETAILED DESCRIPTION OF THE PREFERRED EMBODIMENT

The present invention provides a software application configured for a sales person to connect and communicate concurrently with all their prospects across multiple social media channels including conventional email and be able to incubate the leads over the lead engagement cycle. It offers a robust system for a sales person to go to one place and manage all their contacts (leads), calendars and all aspects of their sales campaigns and communication over multiple social channels.

The admin panel in this software application defines what social media channels the sales person wishes to engage in their sales/marketing campaigns. E. g. Facebook, Twitter, Google+ etc and also the system then connects the sales person actively to these channels using published APIs from these social channels. Traditional email campaigns are included but the dominant invention is the ability to engage communications concurrently with multiple social media channels for customer relationship management (CRM) and analytics on lead behavior.

Once established system will open connectors (See FIG. 3) to multiple social networking platforms like Google, Facebook, Twitter and LinkedIn and so on. This will give a universal ability for the sales person to track lead behavior on different social platforms. Using an Authorization and Authenticated database, this information is stored and retrieved in to CRM database pool or server farms and accessed with high speed. Such information can also be optionally replicated in to other Single Sign ON (SSO) systems like Transaction Management (shown in Compliance block) OR financial management (ERP) shown under Money block.

The CRM module may interface with an MLS module (Multiple Listing service or any paid sources of database) as shown in FIG. 3. This module may allow the user custom searching, reviewing and creating online flyers for multiple properties, custom drag and drop flyers. The MLS module integrates with a legacy based MLS system (not shown) to enable the import of legacy based MLS system data in to the CRM database such that the legacy based MLS system data is readily available to the managing of prospects and leads.

Using the application, the sales person (subscriber) can instantly connect to all selected contacts they have on many channels like Facebook, Google etc. They can further download all or preselected list of contacts in to the central CRM database (FIG. 4).

The same application allows users to modify the contents of some of these contacts and push/write back to the sources where they came from.

Using the application, the sales person (subscriber) can instantly connect to all selected calendars they have on many channels like Facebook, Google etc. They can further download calendar contents from each source in to the central CRM database (FIG. 4).

The same application allows users to modify/delete or create new events and push/write them back to the calendars of the sources where they came from.

In FIG. 5, each user can see their own centralized contacts with different status and centralized Calendars showing all events and sources from which they came from. They could optionally expand on this window to open up all the details of the contact or calendar in a new browser window.

FIG. 6 shows detailed database schema for one sample database tree hierarchy for the CRM. The Communication threads are shown along with fields contained under Lead which stores all information related to contact/lead, items they are interested in, preferences in modes of communication and flags if they need to pushed automatically to other channels e.g. Plaxo or Google if any status changes.

As shown in FIG. 7, the software application also allows users to see instantly on the main connections dashboard as to which contact/leads came from which source and if they have been "authorized" to certain social media. This information is further carried to other modules within the CRM so user can choose to exercise the appropriate media for communication with the customer at any given point in time in the lead engagement cycle. A lead coming from one Source e.g. Facebook contact can also be searched automatically on another platform like LinkedIn allowing rich social media cross section of information for a given lead.

FIG. 8 is a powerful encapsulation of Linked IN platform in the CRM targeted for recruitment. Once authorized and opened, it gives a display of the sales person own contact as shown in the middle column. Then they can see details of their own contacts OR search for NEW people on Linked IN, authorize them and view them and start communicating with them, using the SEND MESSAGE command. FIGS. 9a and 9b (split screens) show the information on every prospect from social channels is stored permanently in the CRM database for the lead for future use and analytics.

FIG. 10 is yet another implemented feature of the CRM allowing users to cross connect their own harvested prospects with their own contacts to avoid duplication.

FIG. 11 shows the central communication log panels for searching all micro blogs, messages send/received in the CRM for that account including email communications. These panels can be searched for a specific message based on date range, user types, social channel and whether it is INBOUND or OUTBOUND.

The invention is directed to an apparatus for receiving and processing lead and prospect data related to customer relationship management. The invention may also include a dedicated processor configured to communicate with computers that communicate among one or more networks to receive and transmit data packets related to performing this task. However, it will be appreciated by those skilled in the art, that this is illustrative of only one utility of the invention, and that the invention has greater applicability and utility in many other applications where efficient routines and processing of data for performing online CRM with one or more networks is involved. Equivalent structures embodying the invention could be configured for such applications without diverting from the spirit and scope of the invention. Although this embodiment is described and illustrated in the context of modern databases, the invention extends to other applications where similar features are useful. Furthermore, while the foregoing description has been with reference to particular embodiments of the invention, it will be appreciated that these are only illustrative of the invention and that changes may be made to those embodiments without departing from the principles of the invention, the scope of which is defined by this overall description or any subparts herein.

The invention claimed is:

1. An online unified customer relationship management contact and communication management platform having one or more processors and a non-transitory computer-readable medium containing program instructions that cause said one or more processors to:

securely import a plurality of contacts from at least one online or offline user selected and authorized accounts on cloud computing systems at a plurality of social networking platforms using at least one of email, instant messaging, social networks, and integrated telephony;

securely import a plurality of calendars from at least one online or offline user selected and authorized accounts at a plurality of social networking platforms using at least one of email, instant messaging, social networks, and integrated telephony, wherein when a first imported contact or calendar is from a first user selected and authorized account at a first social networking platform, a second imported contact or calendar is from a second user selected and authorized account at a second social networking platform, and wherein the first social networking platform is different from the second social networking platform;

synchronize and aggregate the plurality of imported contacts and calendars into one or more central unified databases;

modify at least one contact information or create at least one contact in the one or more central unified databases, including information indicating the platform origin of each of the imported contacts by consolidating cross-platform contact information for individual contacts and displaying the consolidated cross-platform contact information such that the user can select and view contact information for each contact in a platform indicating cross reference screen and search for messages based on social networking platform;

create at least one calendar with at least one event in the one or more central unified databases, including information indicating the platform origin of the event;

securely export a plurality of contact information from the one or more central databases to a plurality of user selected and authorized accounts at a plurality of social networking platforms using email, instant messaging, social networks, or integrated telephony; securely export a plurality of calendar information from the one or more central databases to a plurality of user selected and authorized accounts at a plurality of social networking platforms using email, instant messaging, social networks, or integrated telephony, wherein if a first exported contact information or calendar information is exported to a third social networking platform, a second exported contact information or calendar information is exported to a fourth social networking platform, and wherein the third social networking platform is different from the fourth social networking platform; and wherein the online unified contact and communication management platform enables a user to send and receive instant messages with the one or more synchronized contacts and wherein the online unified contact and communication management platform records communication threads with a contact in one or more databases; and wherein the synchronized contacts are automatically grouped into social groups or made part of an existing social campaign; and wherein the online unified contact and communication management platform is further configured to authorize, provide and save social media searches.

2. The online unified business lead contact and communication management platform of claim 1, wherein contacts and calendars are imported using one or more software plug-in enabled on user's systems or browsers.

3. The online unified business lead contact and communication management platform of claim 1, wherein imported contact or calendar information from one social media source on a first social networking platform and associated with a particular business lead contact can be further used to automatically perform one or more cross reference searches for user profiles associated with the particular business lead contact from several other social media sources on a plurality of other social networking platforms concurrently and save results of the one or more cross reference searches in the one or more central unified databases.

4. The online unified business lead contact and communication management platform of claim 1, further configured to import and synchronize contacts using one or more stored business rules.

5. The online unified business lead contact and communication management platform of claim 1, further provides transaction management monitoring for users connected with the plurality of social networking platforms.

* * * * *